United States Patent
Walthert et al.

(10) Patent No.: US 10,933,691 B2
(45) Date of Patent: Mar. 2, 2021

(54) HUB, IN PARTICULAR FOR BICYCLES

(71) Applicant: DT SWISS INC., Grand Junction, CO (US)

(72) Inventors: Martin Walthert, Aarberg (CH); Stefan Spahr, Lengnau (CH)

(73) Assignee: DT SWISS INC., Grand Junction, CO (US)

( * ) Notice: Subject to any disclaimer, the term of this patent is extended or adjusted under 35 U.S.C. 154(b) by 128 days.

(21) Appl. No.: 16/255,231

(22) Filed: Jan. 23, 2019

(65) Prior Publication Data
US 2019/0152257 A1 May 23, 2019

Related U.S. Application Data

(63) Continuation-in-part of application No. 15/882,423, filed on Jan. 29, 2018, now Pat. No. 10,625,540.
(Continued)

(30) Foreign Application Priority Data

Jan. 25, 2018 (DE) .......................... 102018101720.0

(51) Int. Cl.
*F16D 41/32* (2006.01)
*B60B 27/02* (2006.01)
(Continued)

(52) U.S. Cl.
CPC ........ *B60B 27/023* (2013.01); *B60B 27/0031* (2013.01); *B60B 27/0047* (2013.01);
(Continued)

(58) Field of Classification Search
CPC .............. B06B 27/047; B06B 27/0031; B06B 27/0047; B06B 27/023; F16C 2226/60; F16D 41/30; F16D 41/32
See application file for complete search history.

(56) References Cited

U.S. PATENT DOCUMENTS

| | | | |
|---|---|---|---|
| 4,593,799 A | 6/1986 | Ozaki | |
| 5,676,227 A | 10/1997 | Huegi | |

(Continued)

FOREIGN PATENT DOCUMENTS

| | | |
|---|---|---|
| DE | 102010033268 A1 | 2/2012 |
| EP | 2848171 A1 | 3/2015 |
| GB | 668943 A | 3/1952 |

OTHER PUBLICATIONS

"What is the difference between screw pitch and lead?", retrieved from https://www.thomsonlinear.com/en/support/tips/difference-between-screw-pitch-and-lead. (Year: 2020).*

(Continued)

*Primary Examiner* — Stacey A Fluhart
(74) *Attorney, Agent, or Firm* — Greer, Burns & Crain, Ltd.

(57) ABSTRACT

A hub for bicycles or the like including a hub shell which is rotatably supported relative to a hub axle, a rotor rotatably supported relative to the hub axle, and a freewheel device having two interacting freewheel components namely, a hub-side freewheel component and a rotor-side freewheel component. The two freewheel components each contain axial engagement components. The hub-side freewheel component is non-rotatably and axially fixedly connected with the hub shell. The rotor-side freewheel component is non-rotatably connected with the rotor and is movable in the axial direction relative to the rotor and the hub shell between a freewheel position and an engagement position. Rolling members are provided for defined accommodation in the hub-side freewheel component to support the hub shell relative to the hub axle. The hub-side freewheel component is connected with the hub shell through a multiple thread having at least two separate, axially spaced apart thread grooves.

21 Claims, 6 Drawing Sheets

Related U.S. Application Data which is a continuation-in-part of application No. 15/659,830, filed on Jul. 26, 2017, now Pat. No. 10,442,245, and a continuation-in-part of application No. 15/659,850, filed on Jul. 26, 2017, now Pat. No. 10,549,578.

(51) Int. Cl.
  *B60B 27/04* (2006.01)
  *B60B 27/00* (2006.01)
  *F16C 25/06* (2006.01)
  *F16C 19/54* (2006.01)
  *F16C 35/077* (2006.01)

(52) U.S. Cl.
  CPC ............ *B60B 27/047* (2013.01); *F16C 19/54* (2013.01); *F16C 25/06* (2013.01); *F16C 35/077* (2013.01); *F16D 41/32* (2013.01); *F16C 2226/60* (2013.01)

(56) References Cited

U.S. PATENT DOCUMENTS

| | | |
|---|---|---|
| 6,588,564 B1 | 7/2003 | Jaeger et al. |
| 7,641,904 B2 | 1/2010 | Kim et al. |
| 8,757,341 B2 | 6/2014 | Klieber |
| 8,936,144 B2 | 1/2015 | Spahr et al. |
| 9,010,875 B2 | 4/2015 | Spahr et al. |
| 9,212,708 B2 | 12/2015 | Spahr et al. |
| 10,065,452 B2 | 9/2018 | Walthert et al. |
| 2006/0043786 A1 | 3/2006 | Lin |
| 2008/0006500 A1* | 1/2008 | Spahr .................. B60B 27/0073 192/64 |
| 2009/0277741 A1 | 11/2009 | Chen |
| 2010/0170762 A1* | 7/2010 | Schlanger ............... F16D 41/36 192/46 |
| 2012/0032498 A1* | 2/2012 | Klieber ................. B60B 27/047 301/55 |
| 2012/0048671 A1 | 3/2012 | Kozak et al. |
| 2012/0275785 A1 | 11/2012 | Dasamaneni et al. |
| 2013/0088075 A1 | 4/2013 | Spahr et al. |
| 2013/0105266 A1 | 5/2013 | Spahr et al. |
| 2014/0060992 A1* | 3/2014 | Spahr ..................... F16D 41/26 192/64 |
| 2015/0060224 A1 | 3/2015 | Lee |
| 2016/0121961 A1* | 5/2016 | Schlanger ............. B60B 27/026 301/124.2 |
| 2017/0097112 A1* | 4/2017 | Langer .................. F16L 19/025 |
| 2018/0029412 A1 | 2/2018 | Walthert et al. |
| 2018/0029413 A1 | 2/2018 | Walthert et al. |
| 2018/0050564 A1 | 2/2018 | Walthert et al. |
| 2019/0030951 A1 | 1/2019 | Walthert et al. |
| 2019/0032730 A1 | 1/2019 | Walthert et al. |

OTHER PUBLICATIONS

European Search Report from corresponding European Patent Application No. 19153579.8, dated Jun. 21, 2019.

German Search Report from German Patent Application No. 102018101720.0, dated Oct. 11, 2018.

\* cited by examiner

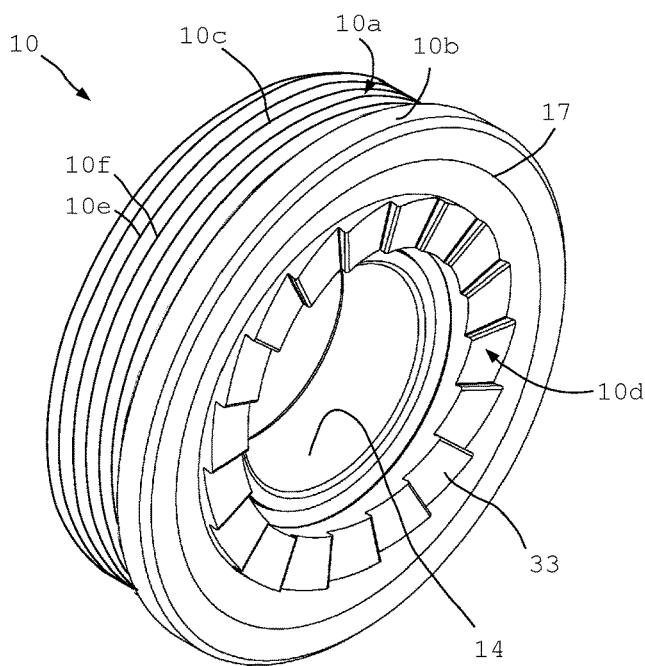
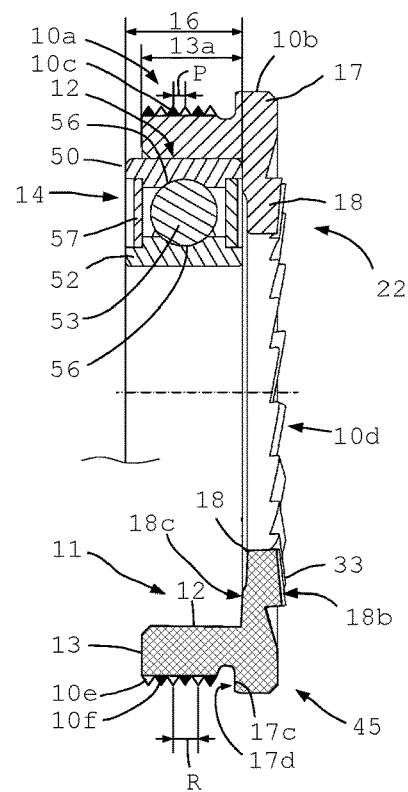
Fig. 5
Fig. 6
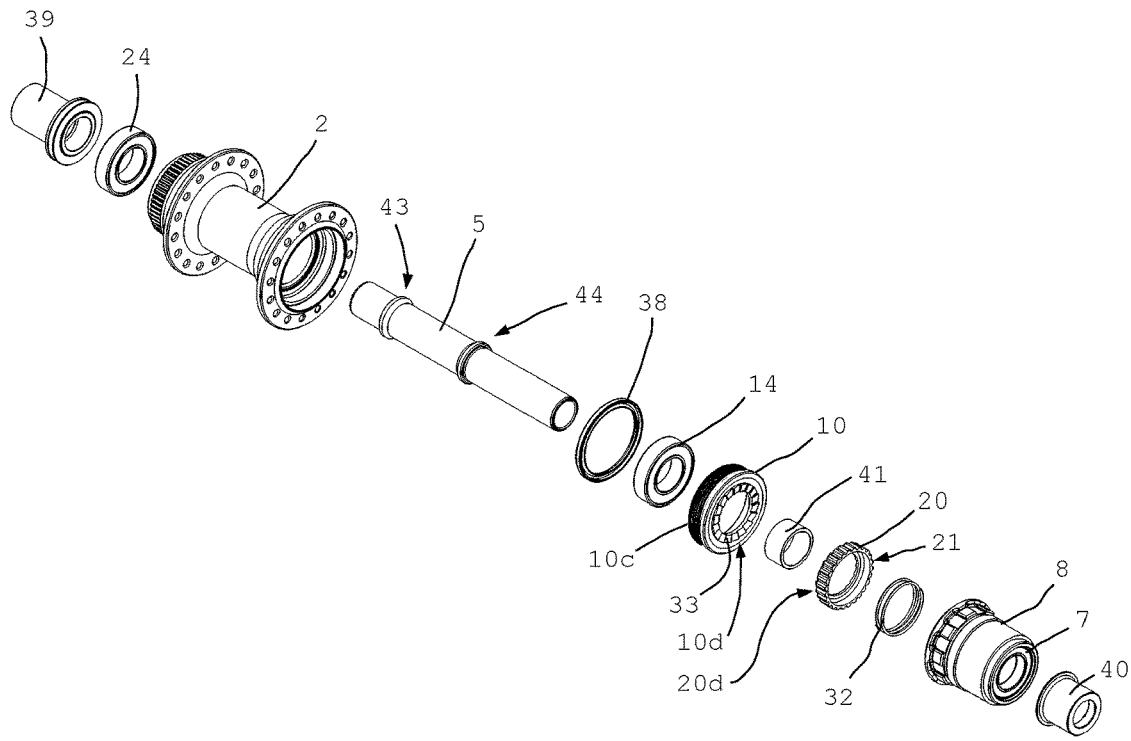
Fig. 7

HUB, IN PARTICULAR FOR BICYCLES

RELATED APPLICATIONS

The present application is a Continuation-in-Part of and claims 35 USC 120 priority from U.S. patent application Ser. No. 15/882,423 filed Jan. 29, 2018, which is also a Continuation-in-Part of both U.S. application Ser. Nos. 15/659,830 and 15/659,850, both filed Jul. 26, 2017, all of which are incorporated by reference herein.

BACKGROUND

The present invention relates to a hub for at least partially muscle-powered vehicles and in particular bicycles, the hub comprising a hub shell which is in particular rotatably supported relative to a hub axle by way of two roller bearings disposed on opposite end regions of the hub shell. The hub comprises a rotor for non-rotatable arrangement of at least one sprocket, the rotor being in particular rotatably supported relative to the hub axle by means of at least two rotor bearings. A freewheel device is provided between the rotor and the hub shell.

Other than in bicycles, the hub may be used in other partially muscle-powered vehicles and two-wheeled vehicles which are for example provided with an electric auxiliary drive. The hub is in particular used in sports bicycles. In all the configurations, the hub according to the invention is employed in vehicles and in particular bicycles which in normal and regular proper use are at least partially muscle-powered.

The prior art has disclosed various hubs comprising a freewheel so that the pedal crank will not keep rotating along, for example during a downhill ride. This freewheel also allows contrarotating of the hub shell versus the rotor in backpedaling.

The prior art has disclosed hubs with ratchet freewheels where the pawls can radially pivot between a freewheel position and an engagement position. These hubs are provided with different numbers of ratchet pawls and tend to show four ratchet pawls symmetrically distributed over the circumference. As force is transmitted, the ratchet pawls engage a toothing in the rotor. The relatively low number of ratchet pawls results in a relatively large angle of rotation until rotational force is transmitted when pedaling is resumed.

GB 668,943 has disclosed a freewheel hub for bicycles showing screwed into the hub shell a shell-shaped part whose inside surface forms the raceway for the ball of the ball bearing, while a radially outwardly extending wall has an axial toothing formed thereat which together with an axial toothing forms an axial freewheel at the rotor. Due to the larger number of teeth of the axial toothing, re-engagement is faster as pedaling is resumed. The drawback of this system is that the rotor shifts in the axial direction when the hub is transferred to the freewheeling state and the engaged state. With the systems used today, this might cause a gear shift. Moreover, dirt and moisture might enter the freewheel and the hub interior, impeding or even entirely disabling the function which is dangerous to the rider.

DE 94 19 357 U1 has disclosed a hub with a toothed disk freewheel which reliably and very quickly transmits the driving force from the rotor to the hub shell while otherwise, friction losses are relatively low while the user is not activating the pedals. A toothed disk freewheel has many advantages and allows particularly fast response of the freewheel. In this freewheel a pair of toothed disks transmits forward rotational force of the rotor while in backpedaling, the teeth disengage axially. The known hub per se functions satisfactorily and is used in the area of sports and also in professional riding. However, there is the disadvantage that the high loads acting on the hub for example in uphill rides may generate bending moments in the hub so as to cause the toothed disk to slightly tilt, which results in higher wear on the teeth which are subjected to higher forces so that durability is limited and the toothed disks require early replacement to avoid malfunction.

DE 10 2010 033 268 A1 discloses a hub in which two end-toothed components form an axial freewheel. Pairs of adjacent hub bearings at the hub shell ends serve as supports relative to the hub axle. The drawback is the high space requirement for the adjacent hub bearings. Moreover, the hub axle is not provided with any radial shoulders so that it cannot serve to axially support the hub components. Therefore, to axially support the hub the axial force is transmitted from a roller bearing by means of its rolling member into the hub shell on one side and on the other side it is dissipated through the rolling members of a roller bearing via sleeve elements disposed on the hub axle. In another embodiment shown in a simplistic illustration, one or two hub bearings are accommodated on the inside of the end-toothed component, and in yet another embodiment shown in a simplistic illustration, an end toothing of the axial freewheel is integrally formed at the outer bearing race of the hub bearing so as to enable saving axial mounting space if only one hub bearing is used. The drawback is, however, that the axial forces must again be transmitted radially through the rolling members of the bearing into the hub shell. A freewheel must be configured for rotational forces of up to 400 Nm and higher. This means that in the course of operation, the end-toothed component screwed into the hub shell keeps being urged ever further into the hub shell to result in a locally high compression of the hub shell. The high loads may result in local hub shell deformation. Deformation also involves deformation of the bearing seat or the bearing shell which may result in considerable drawbacks as regards the durability of the hub and also in disadvantageous riding properties. Heavy deformation due to local buckling of the hub shell may result in the hub shell breaking or alternately, the wall thicknesses require reinforcing which, however, increases the weight.

Also, hubs with toothed disk freewheels have been disclosed which are provided with a freewheel having an axial toothing, wherein an axial toothing is fixedly integrated in the rotor and a toothed disk is non-rotatably and axially displaceably accommodated in the hub shell by means of one or more springs and is axially biased in the direction toward the toothing in the rotor. Reversely, a hub has also been disclosed which includes a toothed disk freewheel and has a toothed disk fixedly integrated in the hub shell and where the other of the toothed disks is biased by means of a spring in the direction of the hub shell. Then again, both these hub types providing for axial movability of only one of the toothed disks show the disadvantage due to the high loads in sports or professional cycling that some of the teeth are subjected to higher loads and faster wear so that early replacement on a regular basis is advisable of the toothed disks, the rotor or even the hub shell to avoid malfunction.

A feasible alternative would be a stiffer configuration overall of a hub with a toothed disk freewheel by employing stiffer and thus heavier materials or by employing greater wall thicknesses which would increase the weight though.

However, since in sports and professional cycling each and every gram of weight counts, this does not provide the desired solution.

EP 1 121 255 B1 has disclosed a lightweight hub having a toothed disk freewheel and showing reliable function, wherein the teeth of the toothed disks are stressed more evenly. This hub uses a pair of toothed disks, both of which are axially movable and are axially urged toward one another from the outside by means of a spring. The two toothed disks are thus floatingly supported and e.g. in case of the hub flexing or given other types of stresses they may show better positioning to one another so as to provide more even wear on the toothed disks and a particularly reliable operation. However, an even stiffer hub is desirable.

Against the background of the prior art it is therefore the object of the present invention to provide a hub which is also lightweight or more lightweight still and which provides for structurally minor or minute deformation in operation and which is in particular more lightweight and stiffer in configuration.

SUMMARY

A hub according to the invention is provided (in normal and regular proper use) for at least partially muscle-powered vehicles, and in particular two-wheeled vehicles and preferably bicycles and comprises a hub shell which is rotatably supported relative to, and in particular on a hub axle (in particular by way of two roller bearings disposed on opposite end regions of the hub shell). The hub comprises a rotor rotatably supported (in particular by means of at least two rotor bearings) relative to (and in particular on the hub axle by means of the rotor bearings) and particularly preferably disposed fixed in the axial direction or axially stationary in operation to non-rotatably dispose at least one sprocket. A freewheel device having two interacting freewheel components is comprised namely, a hub-side freewheel component and a rotor-side freewheel component. The two freewheel components each comprise axial engagement components for intermeshing with one another and they are movable relative to one another in the axial direction at least between a freewheel position and an intermeshing engagement position. The hub-side freewheel component (and the axial engagement components formed thereat) is non-rotatably and axially fixedly connected with the hub shell. The rotor-side freewheel component (and the axial engagement components formed thereat) is non-rotatably connected with the rotor, and is movable in the axial direction relative to the rotor and the hub shell at least between a freewheel position and an engagement position. The hub-side freewheel component provides for defined accommodation of the rolling members to support the hub shell relative to the hub axle. The hub-side freewheel component is connected with the hub shell through a (multiple) thread showing at least two separate, axially spaced-apart thread grooves.

This means that a thread connection between the hub-side freewheel component and the hub shell is provided with at least two separate, axially spaced-apart thread grooves. The hub-side freewheel component is in particular provided with at least two separate, axially spaced apart thread grooves which are screwed into the hub shell by means of fitting (shape and in particular number) thread grooves.

In the sense of the present invention, the wording that the hub-side freewheel component provides for defined accommodation of the rolling members is understood to mean that the rolling members show defined accommodation indirectly or directly in the hub-side freewheel component. "Defined accommodation" means that the position of the rolling members is defined relative to the hub-side freewheel component. For example, a roller bearing equipped with rolling members may be pressed or inserted into and e.g. fixedly attached to the hub-side freewheel component. Alternately, it is possible for the rolling members to be provided for defined rolling off on a surface of the hub-side freewheel component.

The hub according to the invention has many advantages. The hub according to the invention in particular allows a lightweight and stiff architecture. A considerable advantage is achieved by providing at least two thread grooves in the screwed connection between the hub shell and the hub-side freewheel component. The hub shell and the hub-side freewheel component are screwed to one another wherein the hub shell thread and/or the hub-side freewheel component thread are each provided with at least two separate, axially spaced apart thread grooves. This construction enables an increased thread groove gradient. The gradient angle is larger and thus the axial force effective in the screwed state is lower. Thus, the pressure acting on the hub shell is lower. It is possible to provide the hub-side freewheel component and the hub shell with different numbers of thread grooves as long as the shape and configuration of the thread grooves match. For example, the hub-side freewheel component may show a multiple external thread having two thread grooves and e.g. one circumferential rectangular groove so as to provide three circumferential structures. This structure screws into an internal thread having three thread grooves even though only two of the thread grooves engage, providing stability.

In all the configurations, it is preferred for at least one thread groove to show a gradient of at least 1.8 mm or 2.0 mm or at least 2.5 mm and in particular at least 3 mm and preferably at least 3.5 mm or 4 mm or 5 mm or 6 mm or more. The gradient is in particular larger than is the number of thread grooves multiplied by 1.0 mm and preferably 1.5 mm. Consequently, given two thread grooves the gradient is preferably larger than 2 mm (3 mm) and given three thread grooves, preferably larger than 3 mm (4.5 mm).

Given a gradient that is larger (e.g. 1.5 mm or 2 mm) than in the prior art (e.g. 1 mm), one can still insert a finer thread so as to provide a still better guide for the thread ring in the hub shell. This allows enhanced centering of the freewheel component. Moreover, the axial forces are lower due to the changed geometric conditions.

In operation, the driving torque urges the hub-side freewheel component in the screwing direction such that the drive forces result in increasing pressure on the hub shell and within the hub shell. For reasons of weight, however, the hub shell is as a rule made of a lightweight material. Moreover, the wall thicknesses are reduced as much as possible to decrease the weight and aerodynamic drag (smaller cross-sectional area).

These two factors result in possible local deformation of the prior art hub shell due to the occurring loads. In the case of defective or too narrow dimensions, high loads may result in breaks of the prior art hub shell which in turn results in high injury potential. The alternative of a stronger material leads to increased weight or noticeably higher costs.

The present invention offers a considerable advantage since the acting axial forces are noticeably reduced. A double-pitch (or triple-pitch) or n-pitch thread doubles (triples) the gradient angle or multiplies it by "n" while the pitch remains unchanged. Overall, the forces acting axially inwardly into the hub shell in the axial direction are considerably lower so that no hub shell deformation or at least noticeably reduced deformation occurs. The wall thickness may be reduced while concurrently increasing safety. The forces deforming the bearing seat are smaller. This achieves enhanced riding properties given high loads.

The self-retention is reduced which is again advantageous regarding loads. The self-retention of the thread is still sufficient though. Autonomous detaching need not be feared. Moreover, detaching is considerably simpler when removing or exchanging a hub-side freewheel component.

Overall, the invention reduces the total weight and aerodynamic drag, while the stability under load increases.

In particular, the hub shell consists at least partially or entirely of a light metal alloy such as e.g. aluminium alloy and/or magnesium alloy and/or carbon and/or fiber-reinforced plastic.

Preferably the hub shell includes (at least) one attachment portion and (at least) one centering portion. The hub-side freewheel component in particular includes (at least) one attachment area and (at least) one centering area. Then, the attachment area is connected with and in particular screwed to the attachment portion and the centering area is centered on the centering portion.

A considerable advantage of this specific embodiment furthermore consists in the defined accommodation of the hub-side freewheel component in the hub shell. Thus, assembling a wheel and exchanging hub components show considerably improved reproducibility. In the case of hubs whose roller bearing seat is configured on the freewheel component, trials and tests performed by the applicant have shown that exchanging hub components showed quite considerable wheel centering errors. Considering that e.g. caliper brakes provide for a very narrow gap between the brake pad and the braking area on the rim, such a centering error may have quite considerable consequences.

If for the purpose of maintenance for example the hub-side freewheel component or a roller bearing in a defined accommodation therein or pressed in is to be exchanged, then the entire wheel may have to be re-centered. A significant cause of these centering errors, e.g. in the case of hub-side freewheel components screwed into the hub shell is that a screwed connection does not ensure precise centering. The exact radial position of the hub-side freewheel component depends on the manufacturing tolerances in general, and specifically also on the type of manufacturing and type of the thread. Thus, given basically identical hub-side freewheel components, the thread may begin at a slight offset due to the thread gradient. When screwing in different (while per se manufactured identically) hub-side freewheel components, this may among other things result in a slight radial offset and optionally a slightly different orientation. Due to the radially differing dimensions of the hub-side freewheel component and the hub shell, the radial positions may differ even if the hub-side freewheel component is e.g. firmly screwed into the hub shell.

These differences, even if they are minimal, are considerably intensified due to the different diameters of the hub (respectively hub-side freewheel component) and the wheel where they cause correspondingly intensified deflections which may cause insufficient centering of a wheel due to exchange of parts e.g. in the hub interior. This may necessitate full re-centering or dismantling followed by re-assembly.

The invention offers an advantageous solution therefor by way of connecting an attachment area of the freewheel component with the attachment portion of the hub and by guiding or centering a centering area of the freewheel component on the centering portion of the hub. This allows a considerable reduction in deviations when assembling and exchanging hub parts.

Integrating the rolling members or a roller bearing in the hub-side freewheel component allows selection of a lateral axial distance of the roller bearings for supporting the hub shell that is considerably larger than has been usual thus far. This also considerably improves the lateral stiffness of a wheel equipped therewith.

The rotor and also the hub shell is/are disposed in the same axial positions, both in the freewheel position and in the engagement position. In the engagement position, a driving torque in the direction of drive rotation can be transmitted from the rotor to the hub shell. In the freewheel position, the rotor and the hub shell are preferably decoupled from one another wherein then in the freewheel position, no or an insignificant rotational force is transmitted between the hub shell and the rotor.

The axial engagement components in particular protrude axially and/or act in the axial direction.

The hub-side freewheel component is a separate part and is not integrally formed with the hub shell, since a hub shell tends to consist of one or more components of a lightweight material or of several lightweight materials such as light metal or fibrous composite material, while the freewheel component is at least in part manufactured from (at least) a/one stronger and thus often heavier material. For example, steel is a suitable material for the freewheel component.

When two items of hub-side freewheel components (e.g. during maintenance) are installed sequentially, then the radial positioning is defined by the centering portion and is largely identical. If the items are different, an identical radial positioning is achieved. Thus, differences in orientation or in centering a wheel are largely avoided. Even after replacing hub-side freewheel components and/or rolling members or roller bearings, a wheel may be used immediately and does not require re-centering or even disassembling.

A radial tolerance or radial play between the hub-side freewheel component and the hub shell is preferably larger in the attachment portion than in the centering portion. Radial tolerance is also understood to include play. Thus, radially different positions may ensue in the attachment portion (absent the centering portion), depending on the tolerances and on manufacturing.

In the assembled state, no actual play is present since the hub-side freewheel component is fixedly connected with the hub shell. The ensuing actual radial positioning, however, depends on the given tolerances respectively the play prior to installing. Depending on the assembly and the component used (within the admissible manufacturing tolerances), different radial positioning may ensue which, although showing minor absolute deviations, may show considerably increased effects due to the leverage.

In preferred configurations, the radial tolerance (the radial play) between the hub-side freewheel component and the hub shell at the centering portion is less than half that at the attachment portion. In particular, is the radial tolerance in the centering portion less than ¼ of the radial tolerance in the attachment portion.

In preferred specific embodiments, the centering portion shows a free fit of less than 20 μm radial tolerance or play and in particular a radial tolerance of less than 10 μm and preferably less than 5 μm or even less than 3 μm.

In particularly preferred configurations, a transition fit is formed in the centering portion and the centering area. This means that depending on the current manufacture a loose, free fit or (preferably loose) interference fit may be given. Depending on the actual dimensions a slight undersize or oversize may be present.

A "centering area" and an "attachment area" is understood to mean a concrete, physical portion or part of a body.

In other preferred embodiments an interference fit or an oversize fit is configured in the centering portion and the centering area. The inner part is always larger than the outer part. In assembly, the outer part (as a rule, the hub shell) is slightly extended. Preferably an oversize is given in the range between 0 µm and about 20 µm, in particular approximately 5 µm+/−5 µm.

An interference fit (and also a transition fit) achieves a precisely defined orientation of the hub-side freewheel component and thus also of the roller bearing or the rolling members respectively. Even after dismantling and subsequently reassembling the hub with the same or exchanged components, centering does not require any finishing work. In particular, in the case of exchanging components the rim is prevented from axial displacement by a few tenths or possibly as little as ¹⁄₁₀ or ²⁄₁₀ millimeters.

In particularly preferred configurations, the attachment portion and the attachment area are each provided with threads having two, three or more matched thread grooves for screwed connection. Preferably, the attachment area shows a (multiple) external thread to screw into a (multiple) internal thread screwed into the attachment portion of the hub shell. Alternately, it is possible for the freewheel component to be internally threaded to be screwed onto a hub shell stub. In all the configurations, it is particularly preferred for the thread grooves to extend in parallel and adjacent to one another with the 1st thread groove and the 2nd thread groove alternating in the axial direction.

In all the configurations, it is preferred for the hub-side freewheel component to comprise an axial body section.

Preferably, the hub shell includes at least one shoulder for supporting the hub-side freewheel component and/or a roller bearing. Preferably, a washer is disposed between a shoulder in the hub shell and the hub-side freewheel component.

Particularly preferably, the contact surface of the washer with the hub shell is larger than with the hub-side freewheel component. The contact surface with the hub shell is preferably at least 25% and preferably at least 50% and particularly preferably at least 75% larger than the contact surface with the hub-side freewheel component. This achieves an effective pressure distribution on the hub shell which clearly reduces the local load on the hub shell.

To this end, the washer preferably consists of a material harder than that of the hub shell and/or of a material harder than aluminium. The washer preferably consists at least partially or entirely of a material such as steel.

In preferred specific embodiments, the attachment area has an external diameter that is larger than that of the centering area. In particular, given such a configuration, it is possible and preferred for the hub-side freewheel component to comprise an outwardly protruding appendix extending from the axial body section (radially or inclined) outwardly. Then, the centering area is preferably formed (radially outwardly) on the appendix.

Then, a stopper is in particular formed on the axially inside surface of the appendix which when mounted abuts against a radial shoulder of the hub shell.

It is also possible for a front face of the axial body section to be provided with a stopper which in the mounted state rests against the shoulder (a radial shoulder) of the hub shell.

A significant advantage of these configurations including a stopper consists in that the hub-side freewheel component abuts against the respectively a radial shoulder of the hub shell when assembled as intended. This achieves a sufficiently stable support in the hub shell even while the hub-side freewheel component is screwed in. This configuration reliably prevents the hub-side freewheel component from penetrating ever further into the hub shell in operation.

The hub-side freewheel component in particular comprises an annular flange extending inwardly from the axial body section. The axially outside surface of the annular flange is preferably provided with the engagement components, in particular in the shape of an axial toothing.

In advantageous specific embodiments, the hub-side freewheel component comprises the axial body section having an inner central receiving space and a bearing seat formed thereat and a roller bearing received thereat to rotatably support the hub shell. The roller bearing then comprises rolling members. Preferably, the roller bearing rests against the washer.

In the alternative, it is also possible for the outer bearing ring to be formed directly in the hub-side freewheel component respectively on the inside of the axial body section. An inner peripheral surface of the hub-side freewheel component then forms the outer ring of the roller bearing and thus the raceway. The fact that the hub-side freewheel component forms a bearing seat showing a defined accommodation of a roller bearing to rotatably support the hub shell, increasing by a few millimeters the lateral distance of the bearings to support the hub shell relative to the hub axle. This already achieves a considerably increased rigidity of the hub. Any bending moment acting during pedaling is considerably decreased. The lateral axial distance between the surface of force application for transmitting the driving torque and the bearing position is considerably shorter than in the prior art, since the roller bearing is accommodated radially inwardly of the hub-side freewheel component. The distance may even be halved. Moreover, the lateral axial distance of the roller bearings of the hub shell is noticeably increased. The roller bearings for supporting the hub shell relative to the hub axle may be referred to as hub shell bearings. At the same time, the outwardly protruding appendix at the hub-side freewheel component, which in operation shows defined abutting against a shoulder in the hub shell, provides a particularly stable and reliable hub.

Another advantage is that the distance between the two rotor bearings may also be enlarged so as to achieve increased rigidity there. It is also very advantageous that the hub is simpler in its architecture. The hub axle does not require thickening to increase rigidity.

At the same time, the invention allows a clearly more lightweight hub architecture overall, which is moreover combined with higher rigidity. A weight advantage is achieved by way of a more lightweight configuration of the hub-side freewheel component. Another weight advantage is achieved by way of configuring the hub shell respectively the hub sleeve with thinner walls. The known prior art provides for the hub shell to surround the roller bearing and the toothed disk accommodated adjacent thereto in the hub shell. However, a minimum wall thickness of the hub shell must be observed to ensure the required stability. In the known prior art, this results in a hub shell showing a considerably larger wall thickness over a clearly larger axial region compared to the present invention. Thus, the invention achieves higher rigidity combined with a lower weight. In addition, the parts required are fewer in number so as to simplify the architecture and assembly and maintenance. A radially outwardly protruding appendix can moreover distribute the contact pressure of the hub-side freewheel component in the hub shell over a larger diameter, thus achieving a reduced surface pressure. A radially outwardly protruding appendix contributes to the hub-side freewheel component entering deeper into the hub shell.

Axial mounting space is saved by way of the invention. Both the hub shell and also the rotor may be provided with broader axial supports than was the case with the prior art known from EP 1 121 255 B1.

In the invention, the hub-side freewheel component has an inner and central receiving space with a bearing seat and a roller bearing received thereat to rotatably support the hub shell so as to stiffen the hub. The invention increases an axial distance of the roller bearings of the hub shell. The hub shell may overall be supported on a clearly broader basis to thus considerably improve the lateral stiffness of a wheel equipped therewith.

In a preferred specific embodiment, the two freewheel components are biased in the engagement position by means of at least one biasing device. The freewheel components preferably each comprise engagement components (at both freewheel components) configured on the front face which mesh with one another in the engagement position. In this way, in the engagement position the engagement components transmit rotational movement in the driving direction from the rotor to the hub shell. In the freewheel position, a rotation of the freewheel components relative to one another is possible and thus also of the hub shell relative to the rotor. In particular, is the rotor-side freewheel component urged in the direction of the hub-side freewheel component by the biasing device.

In all the configurations, it is preferred for the freewheel components to comprise an axial toothing each. The freewheel device is in particular configured as a toothed disk freewheel. Then, the engagement components are preferably provided by axial teeth which are in particular biased to the engagement position by means of at least one spring or a plurality of springs or spring members. The number of engagement components on each freewheel component is in particular between 16 and 80 and in particular between 18 and 72. This allows very quick responses.

Preferably the rotor-side freewheel component is non-rotatably and axially movably accommodated on the rotor and the hub-side freewheel component is non-rotatably and in particular also axially fixedly coupled with the hub shell. The rotor-side freewheel component is in particular configured as, or comprises, a toothed disk and its front face shows an axial toothing.

In preferred specific embodiments and configurations, the axial body section of the hub-side freewheel component respectively at least part of the axial body section is tubular in design and may be referred to as a tubular body section. In preferred configurations, the axial or tubular body section has a round outer cross-section. Then the round outer cross-section is in particular provided with an external thread with which the axial (tubular) body section is preferably screwed into an internal thread of the hub shell when assembled. Then, the axial (tubular) body section is axially fixedly and non-rotatably connected with the hub shell. The tubular body section is preferably configured substantially cylindrically.

In preferred embodiments, the axial body section is configured such that the axial body section with the outwardly protruding appendix and the inwardly projecting annular flange shows a (an at least substantially) T-shaped cross-section. Then, the annular flange and the appendix may be axially overlapping or at least be approximately located in the same axial position. An S- or Z-shaped cross-section is also conceivable. In the case of a T-shaped cross-section, the crossbar of the "T" and thus the annular flange and the appendix are preferably disposed axially outwardly while the axial or tubular body sections extend further inwardly into the hub shell respectively into the hub. This configuration and this e.g. T-shaped cross-section allow a compact structure and high stability under load. The axially outside surface (relative to the hub) of the annular flange is equipped with the engagement components. The axially inside surface (relative to the hub) of the appendix provides a stopper which (in the assembled state) rests against the radial shoulder in the hub shell. This provides a larger volume of material in the hub shell for reliably transmitting the forces acting on the hub shell so as to provide a lightweight though stable hub.

The bearing seat is preferably configured on the axial and/or tubular body section and in particular radially inwardly thereof.

In another configuration, in a radial section the hub-side freewheel component is preferably substantially L-shaped in cross-section wherein one of the legs of the "L" forms the axial or tubular body section and the other of the legs of the L extends in the radial direction (radially inwardly) and is equipped with the engagement components. Such an L cross-section is in particular present in the absence of a radially outwardly appendix.

Preferably, the hub-side freewheel component accommodates more than ⅔ of the axial width of the roller bearing. In particular, a substantial respectively the most substantial part of the roller bearing shows a defined accommodation on the bearing seat of the hub-side freewheel component. Preferably, the hub-side freewheel component accommodates more than 50% and particularly preferably more than 75% of the axial width of the roller bearing. In preferred configurations, the hub-side freewheel component accommodates between approximately 80% and 90% or between 80% and 99.5% and in particular between 90% and 99.5% of the axial width of the roller bearing. Preferably, there is a clear distance (in the axial direction) between the axially inwardly front face of the axial body section and the hub shell. The clear distance generates a play between the axially inwardly front face of the axial body section and the hub shell and it is in particular larger than 0.02 mm and preferably it is between 0.03 mm and 1.5 mm, in particular between 0.05 mm and 0.6 mm and preferably between 0.08 mm and 0.35 mm. In preferred configurations, the clear distance is between 0.5% and 5% of the axial length of the roller bearing accommodated on the hub-side freewheel component. Such a configuration is in particular preferred if a radially outwardly appendix is present. The clear distance leads to an axial position of the axial body section defined by the radially outwardly protruding appendix and prevents the axial body section from screwing in ever further. The radially outwardly protruding appendix of the hub-side freewheel component in particular protrudes radially outwardly beyond the axial body section and when mounted it rests against the radial shoulder of the hub shell. This achieves an axially defined position of the hub-side freewheel component. The outwardly protruding appendix may be configured as a singular appendix or else several appendices are provided (symmetrically) distributed over the circumference. Alternately, the appendix may be configured as a circumferential flange which extends radially outwardly in particular from the axially outwardly end of the axial body section.

In all the configurations, it is preferred for the hub-side freewheel component to comprise an annular flange the front face of which is provided (axially outwardly) with the engagement components. The annular flange in particular extends radially inwardly on the axially outwardly end of the axial body section. Then, the annular flange forms the inwardly projecting radial leg of the T or an L as it has been described above.

Preferably, a radial bearing shoulder is formed in the hub shell for defined axial alignment of the roller bearing accommodated in the hub-side freewheel component. The roller bearing respectively the outer ring of the roller bearing is in particular positioned in an axially defined position between the radial bearing shoulder in the hub shell and the annular flange. Preferably a defined play is provided on one axial side and on the other axial side the roller bearing is disposed without play. A disadvantageous over definition is thus prevented. Preferably, a free distance is formed between the roller bearing (specifically its outer ring) accommodated in the hub-side freewheel component and the axially inside surface of the annular flange. The free distance provides for axial play. The free distance is in particular larger than 0.02 mm or 0.05 mm. The free distance is preferably larger than 0.1 mm or larger than 0.2 mm, and may be up to and larger than 0.5 mm or 1 mm. The free distance is provided in particular between the axially inside surface of the annular flange and the outer ring of the freewheel-side roller bearing for the hub shell. In a preferred configuration, the free distance is between 0.02 mm and 0.35 mm.

The outer ring of the freewheel-side roller bearing of the hub shell bears against the radial bearing shoulder in the hub shell or against the washer, in particular with its axially further inwardly end so as to cause defined alignment of the roller bearing. It is possible for a clear distance (in the axial direction) to be configured between the axially inwardly front face of the axial body section and the hub shell, and a free distance to be formed between the roller bearing accommodated in the hub-side freewheel component and the axially inside surface of the annular flange. Preferably, the clear distance and the free distance are approximately the same. Due to existing tolerances of component parts and manufacturing and mounting tolerances the clear distance and the free distance may be configured different. The clear distance and the free distance each prevent an over definition in the mounted hub.

In configurations where the axial body section of the hub-side freewheel component rests against a (radial) shoulder in the hub shell at its axially inwardly end, and where preferably no radially outwardly protruding appendix is configured, the roller bearing is particularly preferably accommodated entirely (100%) inside the hub-side freewheel component. Between the axially outwardly end of the roller bearing and the axially inwardly wall of the annular flange of the hub-side freewheel component, there is a small gap as it has been described above. In this configuration and more specific embodiments thereof, the axially inwardly end (of the outer ring) of the roller bearing accommodated in the hub-side freewheel component rests against the radial shoulder in the hub shell against which the axially inwardly end (stopper) of the axial body section of the hub-side freewheel component rests. Preferably, a washer as it has been described above is disposed between the radial shoulder in the hub shell and the roller bearing and the axially inwardly stopper of the axial body section. The washer can distribute the axial pressure over a larger surface.

In advantageous configurations, the biasing device is accommodated in the rotor-side freewheel component. The biasing device may comprise a spring or several springs, for example one (or more) coil spring(s) and/or at least one spring acting by way of magnetic forces. The biasing device is in particular substantially entirely and particularly preferably entirely accommodated inwardly of the rotor-side freewheel component. This offers considerable advantages as regards the axial mounting space, since the rotor-side freewheel component does not, or only very slightly, extends in the axial direction so as to allow saving axial mounting space. This allows a further increase in the hub rigidity. The biasing device may likewise operate magnetically and work according to the principle of magnetic forces of attraction or repulsion. Then, a part of the biasing device may be disposed outwardly of the rotor.

The rotor-side freewheel component in particular comprises an in particular cylindrical guide section having a non-round outer contour meshing with a matching or adapted non-round inner contour in the rotor to enable axial movability of the rotor-side freewheel component relative to the rotor, and to provide the non-rotatable coupling between the rotor and the rotor-side freewheel component.

In preferred configurations, the front face end of the rotor-side freewheel component is configured as a rotor-side annular flange with the engagement components disposed thereat (on the front face).

Preferably the rotor-side freewheel component with the guide section and the rotor-side annular flange disposed on the front face end shows a cross-section approximately L-shaped in the radial direction. An axially aligned leg is formed by the guide section. A radially aligned leg is formed by the front face of the rotor-side annular flange.

Preferably, the biasing device urges the front face of the rotor-side annular flange with the engagement components in the direction of the hub-side freewheel component. Then, the biasing device preferably rests against the inside of the rotor-side annular flange.

The rotor-side annular flange and the (cylindrical) guide section preferably substantially form the rotor-side freewheel component. The guide section and the rotor-side annular flange are particularly preferably manufactured integrally.

Particularly preferably, the biasing device is axially supported outwardly (immediately) against a rotor bearing to rotatably support the rotor. Then, the biasing device is particularly preferably directly and immediately supported on an outer bearing ring of the rotor bearing.

In all the configurations, the bearings for supporting the hub shell and the rotor bearings for supporting the rotor are preferably configured as roller bearings and in particular as deep-groove ball bearings comprising an outer bearing ring (also referred to as outer ring), an inner bearing ring (also referred to as inner ring) and in-between, rolling members disposed in particular in a rolling member cage.

The biasing device may be indirectly supported on a rotor bearing, for example if a disk is disposed between the rotor bearing and the biasing device. Supporting the biasing device immediately on the rotor bearing allows a particularly space-saving architecture, at any rate with the biasing device configured as a cylindrical coil spring. In other configurations, it is also possible to employ a number of single springs which are supported on the outside of the rotor bearing or other components.

Preferably a sealing device is provided between the rotor and the hub shell. The sealing device in particular comprises a non-contact labyrinth gap diverting at least once. Furthermore, the sealing device preferably comprises at least one contacting sealing lip in particular downstream of the labyrinth gap. The sealing device in particular prevents access of water and dust to the freewheel device as extensively as possible, and in particular the most extensively possible. The sealing lip is preferably provided radially further inwardly than the labyrinth gap.

In all the configurations, it is particularly preferred for the rotor and preferably the hub to be provided for largely or completely no-tools dismantling. The hub shell is preferably plugged, the limit stops are in particular plugged on (inserted or preferably pushed on) and the hub is—optionally apart from the hub-side freewheel component—preferably provided for entirely no-tools dismantling. The hub-side freewheel component may likewise be provided for no-tools dismantling. This facilitates assembly and dismantling and thus also maintenance or repairs.

When assembled, a clamping force of the hub is preferably supported via the inner rings of the roller bearings of the hub shell and the inner rings of the rotor bearings. In particular, at least one sleeve body each is disposed for form-fit force transmission of the clamping force, between the freewheel-side roller bearing of the hub shell and the freewheel-side rotor bearing and between the two rotor bearings. In this way, a form-fitting and particularly stable hub is provided. The rolling members of the bearings do not need to transmit the axial clamping force of the hub in the frame or the fork.

Preferably two, and in particular exactly two radial bulges are configured on the hub axle. The two radial bulges are preferably configured in the region of the roller bearings to support the hub shell. Preferably, the radial bulges show on the axially inwardly face a (continuous or gradual or stepless or stepped) increase of the wall thickness and a shoulder each is configured on the axially outwardly side. These shoulders may serve as stoppers for the inner bearing shell of the roller bearings to support the hub shell. Optionally, a spacer such as a disk or a sleeve may be inserted between the stopper and the roller bearing. In all of these configurations, forces may be transmitted through the hub axle and the spacers such as disks, sleeve bodies and inner bearing shells of the roller bearings.

Particularly preferably, the hub axle is configured cylindrical and, other than the radial bulges against which the roller bearings rest to support the hub shell, it shows a substantially constant diameter and a substantially constant wall thickness, wherein the diameter and the wall thickness vary by less than 25% and preferably less than 15%. The interior of the hub axle is particularly preferably cylindrical in configuration.

Preferably, the roller bearings disposed on the opposite end regions of the hub shell rest axially inwardly with their respective inner rings against the radial bulges of the hub axle. The hub axle is thus employed for form-fit force transmission.

Particularly preferably, at least one of the roller bearings and/or the rotor bearings is configured as a deep-groove ball bearing, and in particular as a commercially available and/or standardized deep-groove ball bearing. At least one of the roller bearings and/or the rotor bearings is preferably provided with a rolling member cage and/or bearing seals directly attached to the roller bearing, and preventing entry of water and/or dust into the interior of the roller bearing.

In all the configurations, it is preferred for the hub to be designed for use with a through axle. Preferably the hub comprises a through axle.

It is preferred to provide limit stops which are pushed onto the axle or hub axle or inserted into the hub axle. It is possible to provide exchangeable limit stops with one set of limit stops configured to accommodate a through axle, and another set of limit stops provided to accommodate for example a quick release. The latter set of limit stops shows axially outwardly cylindrical shoulders which are configured to be received in the dropouts of a frame and whose outer diameter is preferably smaller than an inner diameter of the hub axle in a central region of the hub axle. When the hub is delivered with two sets of limit stops, the user may choose whether to use them with the through axle or with a quick release. Later retrofitting is also possible.

All the configurations may be provided with more than two roller bearings to support the hub shell. Then, at any rate (at least) one roller bearing is disposed on each of the two end regions. More than two rotor bearings may likewise be employed.

In another configuration, another hub according to the invention for at least partially muscle-powered vehicles and in particular bicycles comprises a hub shell rotatably supported relative to a hub axle, a rotatably supported rotor and a freewheel device having two interacting freewheel components namely, a hub-side freewheel component and a rotor-side freewheel component. The two freewheel components each comprise axial engagement components for intermeshing with one another. The hub-side freewheel component is non-rotatably and axially fixedly connected with the hub shell. The rotor-side freewheel component is non-rotatably connected with the rotor and is movable in the axial direction relative to the rotor and the hub shell at least between a freewheel position and an engagement position. The hub-side freewheel component is connected with the hub shell through a thread comprising at least one thread groove showing a gradient of at least 2.5 mm and in particular 3 mm and preferably at least 3.5 mm or 4 mm or 5 mm or 6 mm or more. The hub-side freewheel component provides for defined accommodation of rolling members to support the hub shell relative to the hub axle.

This hub is again very advantageous since lower axial forces act on the hub shell. Preferably, the hub shell is rotatably supported on the hub axle by means of two roller bearings disposed on opposite end regions of the hub shell, and the rotor is rotatably supported on the hub axle by means of two rotor bearings. Preferably, the thread is multiple and comprises two or more separate thread grooves. In all the configurations, this hub may show at least one feature (or many or all of the features) of the hub described above.

Further advantages and features of the present invention can be taken from the exemplary embodiments which will be discussed below with reference to the enclosed figures.

BRIEF DESCRIPTION OF THE DRAWINGS

The figures show in:
FIG. 5 a perspective illustration of the hub-side freewheel component;
FIG. 6 a section of the hub-side freewheel component according to FIG. 5;
FIG. 7 an exploded view of the hub according to FIG. 3.

DETAILED DESCRIPTION

Figure 1:
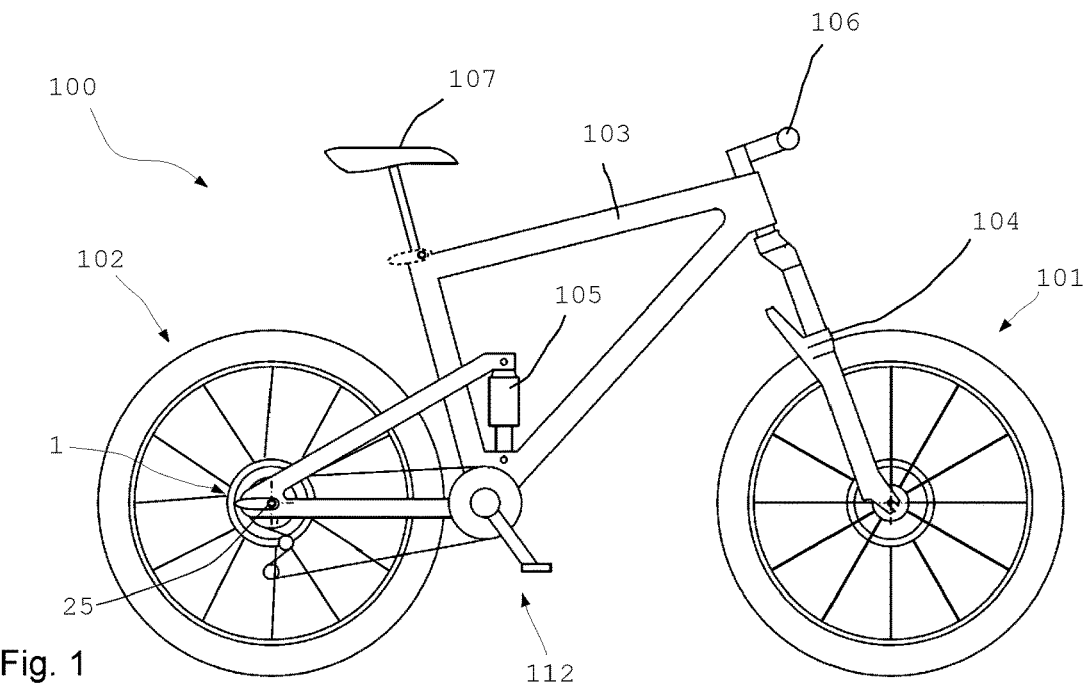
FIG. 1 a schematic illustration of a mountain bike.
Figure 2:
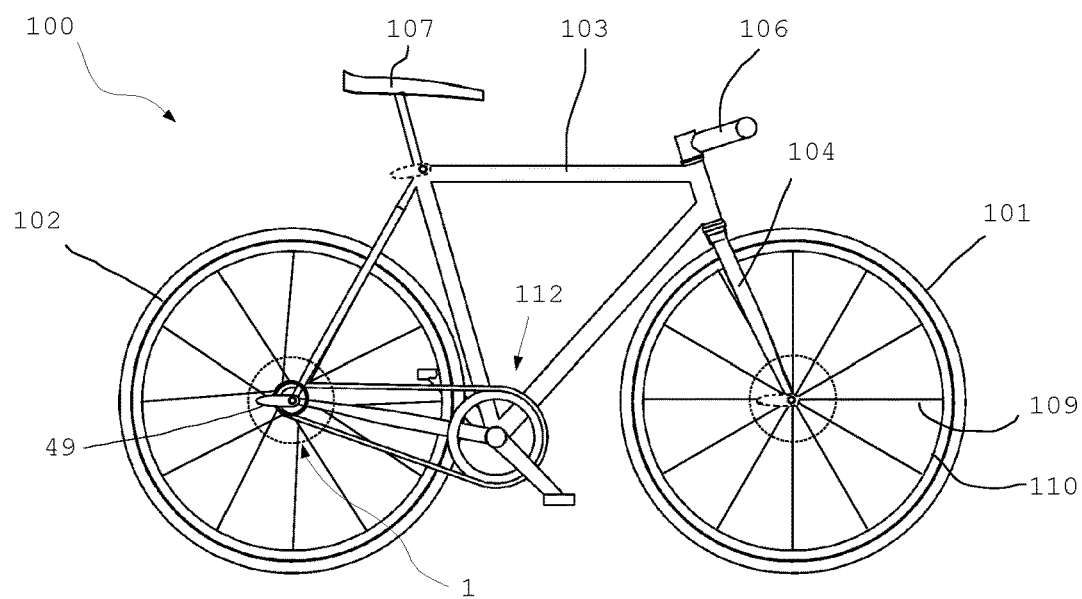
FIG. 2 a schematic illustration of a racing bicycle.

The FIGS. 1 and 2 illustrate a mountain bike or racing bicycle 100 respectively which are equipped with a hub 1 according to the invention. The mountain bike or racing bicycle 100 is provided with a front wheel 101 and a rear wheel 102. The hub 1 according to the invention is used with the rear wheel 102. The two wheels 101, 102 are provided with spokes 109 and a rim 110. Conventional caliper brakes or other brakes such as disk brakes may be provided.

A bicycle 100 comprises a frame 103, a handlebar 106, a saddle 107, a fork or suspension fork 104 and in the case of the mountain bike, a rear wheel damper 105 may be provided. A pedal crank 112 with pedals serves for driving. Optionally, the pedal crank 112 and/or the wheels may be provided with an electrical auxiliary drive. The hubs 1 of the wheels may be attached to the frame by means of a through axle 25 or a quick release 49.

Figure 3:
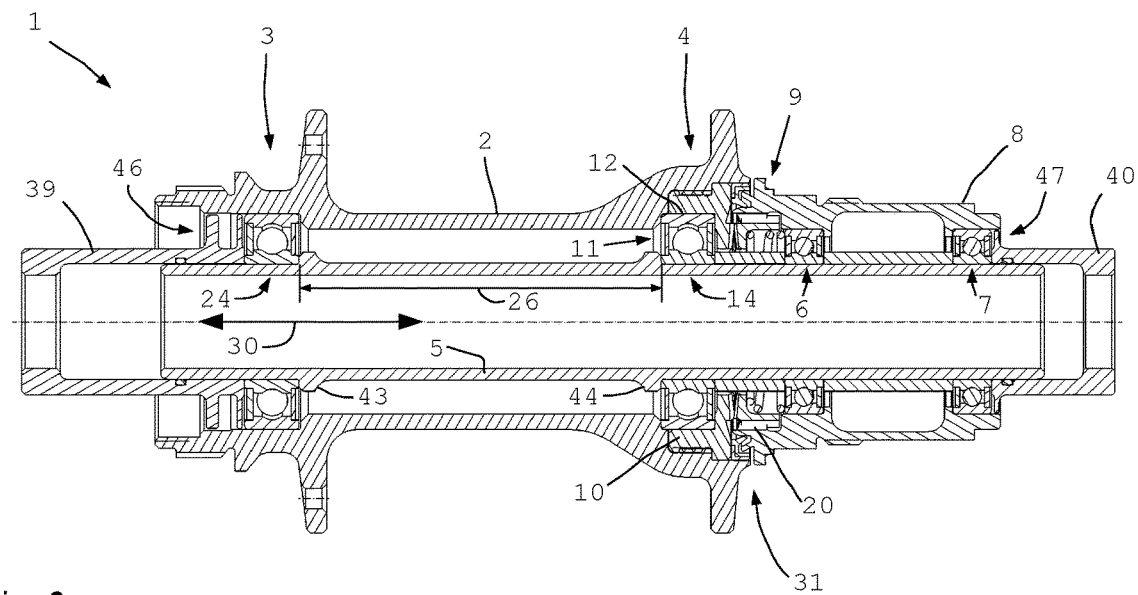
FIG. 3 a section of a hub according to the invention.

FIG. 3 shows in a section the hubs 1 inserted in the rear wheels 102 in the bicycles according to FIGS. 1 and 2.

The hub 1 according to the invention comprises a hub shell 2 which is rotatably supported in the axial end regions 3 and 4 by means of the roller bearings 24 respectively 14 to be rotatable relative to, and presently immediately on, a hub axle 5. This means that the roller bearings 14, 24 are each directly disposed on the hub axle 5.

The hub furthermore comprises a rotor 8 on which to dispose at least one sprocket. In particular, a sprocket cluster may be pushed on and attached or arranged. A freewheel device 9 is provided between the rotor 8 and the hub shell 2, comprising the hub-side freewheel component 10 and the rotor-side freewheel component 20. To prevent penetration of water and dust into the interior of the hub 1, and in particular admission of water and dust to the freewheel device 9, a sealing device 38 is configured between the rotor 8 and the hub shell 2 comprising a labyrinth-like sealing gap and a downstream lip seal contacting the rotor and reliably protecting the freewheel from entry of dirt and water.

Limit stops 39 and 40 are pushed onto the two ends of the hub axle which—while the wheel equipped therewith is not clamped in the frame—are secured on the hub axle by way of O-rings 48. The limit stops 39 and 40 are each provided with a sealing flange 46 or 47 protecting the ends of the hub 1 from entry of dirt and water. This rotor-side limit stop 40 is provided with a radial sealing flange 47 while the other limit stop 39 is provided with a double flange 46 consisting of a pair of radial sealing flanges between which an axial distance and free space is formed.

The roller bearings 14, 24 for rotatably supporting the hub shell 2 rest on radial shoulders in bulges 43, 44 of the hub axle 5. The bulges 43 and 44 are each located axially inwardly of the bearings 14, 24.

In all the configurations of the hub 1, the bulges 43, 44 preferably show a somewhat larger radial wall thickness of the hub axle 5. In particular, is the radial wall thickness in this region between about 1.5 times and 3 times the radial wall thickness in the other regions. Other than the bulges 43, 44, the hub axle 5 is substantially a hollow cylinder in configuration and shows differences in the wall thickness of preferably less than 25% and in particular less than 15% or less than 10% or less than 5% or less than 2%. Preferably, a relationship of the maximum outer diameter of the hub axle (incl. bulge) to the minimum inner diameter of the hub axle is less than 2.0 and in particular less than 1.75 and preferably less than 1.6. Preferably, the relationship of the maximum outer diameter of the hub axle to the minimum inner diameter of the hub axle is larger than 1.25 and in particular larger than 1.4.

The rotor 8 is rotatably (and immediately) supported on the axle 5 by means of a pair of rotor bearings 6 and 7.

The roller bearing 14 is accommodated inwardly of the hub-side freewheel component 10 in a central receiving space 11 in a defined location on a bearing seat 12. This saves considerable axial mounting space so that the stability and rigidity of the hub can be increased. Moreover, the total weight of the hub 1 is considerably reduced. Both the weight of each of the freewheel components and the weight of the hub shell can be reduced since the wall thickness in the rotor-side end region 4 of the hub shell 2 can be reduced.

Figure 4:
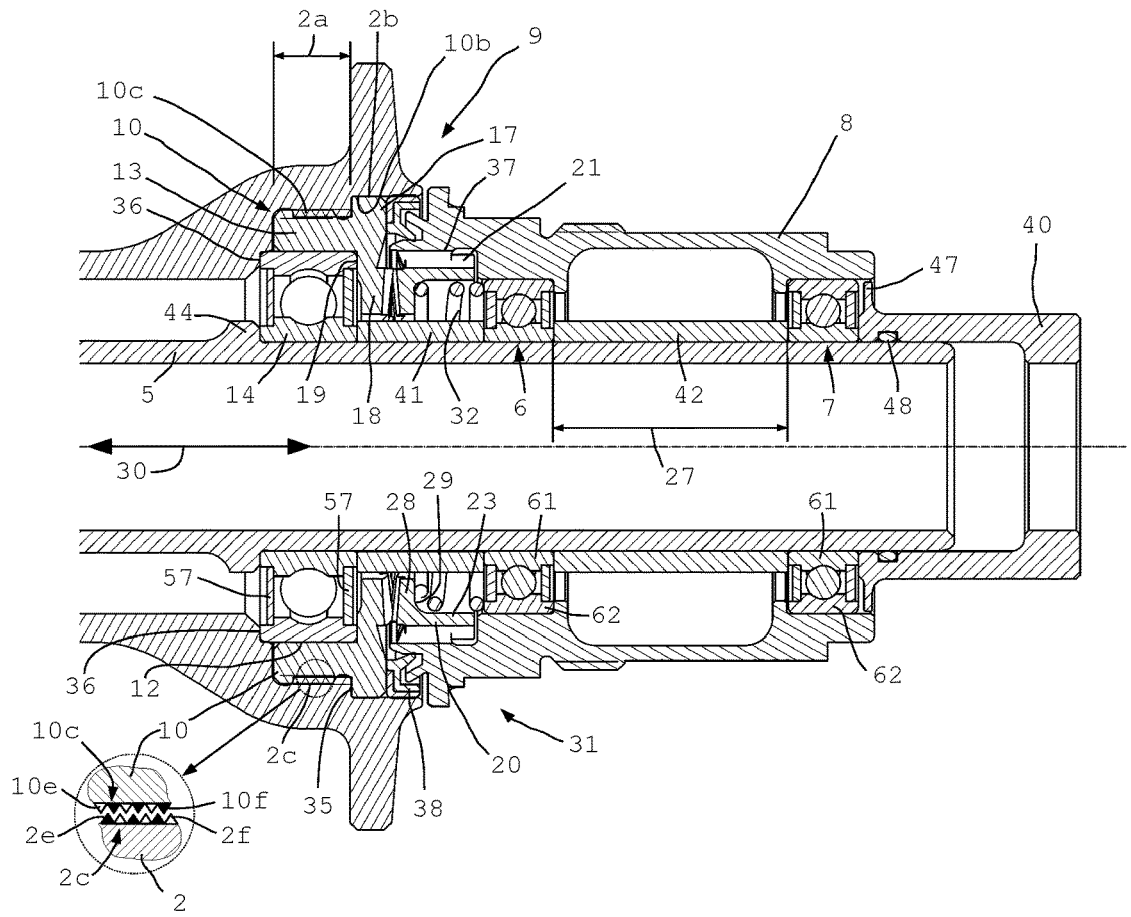
FIG. 4 an enlarged detail of the section in FIG. 3.

FIG. 4 shows an enlarged detail from FIG. 3, with the freewheel device 9 once again shown in the engagement position 31, in which the engagement components 33 (see FIG. 5) designed in particular as axial toothings 10d, 20d (see FIG. 7), of the freewheel component 10 and the freewheel component 20 are in non-rotatable engagement with one another. The engagement components 33 are configured such (see for example FIG. 5) that, given a rotational direction in the driving direction, a rotational force is reliably transmitted to the hub shell 2, while given an opposite rotational direction the freewheel component 20 is urged axially outwardly counter to the biasing force of the biasing device 32 until the engagement components 33 disengage so as to enable a rotation of the rotor relative to the hub shell. The rotor-side freewheel component 20 is provided with a guide section 23 showing a non-round outer contour 21. The non-round outer contour 21 meshes with a matching, non-round inner contour 37 in the rotor 8 and is axially displaceable in parallel to the axial direction 30 in the rotor 8.

This freewheel component 10 shows in radial cross-section an approximately T-shaped configuration where an axial body section 13 has a multiple external thread 10c in an attachment area 10a that screws into an internal thread 2c in the attachment portion 2a in the hub shell so that the freewheel component 10 is axially fixedly and (in the driving direction) non-rotatably connected with the hub shell 2.

The centering portion 2b in which the centering area 10b of the hub-side freewheel component 10 is received in a close fit serves for defined radial positioning of the hub-side freewheel component 10 and the roller bearing 14 accommodated therein. In particular, is the fit nearly without play. An interference fit may be provided so that the hub-side freewheel component 10 is pressed into the hub shell 2 (during screwing in). This centering area 10b is configured on the annular appendix 17.

A cylindrical bearing seat 12 is formed radially inwardly of the axial body section where the rotor-side roller bearing 14 is accommodated to rotatably support the hub shell 2. When the roller bearing 14 is mounted, it is form-fittingly accommodated in the axial direction with its inner ring between the bulge 44 and the sleeve body 41.

The force-fit is effected in the axial direction 30 from the limit stop 40 via the inner ring of the rotor bearing 7, the sleeve body 42, the inner ring of the rotor bearing 6, the sleeve body 41, the inner ring of the roller bearing 14 and it is then introduced via the radial bulge 44 into the hub axle 5 from where it is transmitted via the radial bulge 43 to the inner ring of the roller bearing 24 from where the clamping force is ultimately dissipated via the limit stop 39.

In the mounted state, the appendix 17 of the hub-side freewheel component 10 protruding outwardly and configured circumferentially rests against a radial shoulder 35 within the hub shell 2. The position of the hub-side freewheel component 10 is defined by the radial shoulder 35 in the hub shell.

The roller bearing 14 for supporting the hub shell is accommodated on the bearing seat 12 in the central receiving space 11 and takes a defined position in the hub shell 2 in the axial direction by way of the inner surface 19 of the annular flange 18 of the hub-side freewheel component 10 and the radial bearing shoulder 36. There is preferably a small axial play between the inner surface 19 of the annular flange 18 and the outer ring 50 of the roller bearing 14, while the roller bearing 14 rests against the radial bearing shoulder 36 in the hub shell 2 without play.

The roller bearing 14 preferably has a sealing unit 57 for sealing the roller bearing. Likewise, the other roller bearing 24 and the rotor bearings 6 and 7 are preferably each provided with such sealing units 57 for sealing on both sides.

The hub-side freewheel component 10 is provided with a multiple external thread 10c, presently with two thread grooves 10e and 10f, as can be taken from the enlarged detail in FIG. 4 on the bottom left or else in FIG. 5. Accordingly, the hub shell is provided with a matching multiple internal thread 2c, presently with two thread grooves 2e and 2f. The multiple thread connection between the hub shell and the hub-side freewheel component 10 exerts less axial forces on the hub shell than does a single-thread screwed connection showing the same pitch. The reason is that the gradient angle of the thread groove is considerably larger so that smaller axial forces result. Disassembly is also facilitated since self-retention is lower. Due to the lower axial forces, the hub shell is subjected to lower loads. The wall thicknesses can be reduced while durability is increased.

The rotor-side freewheel component 20 comprises on its front face 22 a rotor-side annular flange 28 on which the engagement components 33 are configured. The rotor-side annular flange 28 is in particular configured integrally with a cylindrical guide section 23 of the rotor-side freewheel component 20. In the interior of the freewheel component 20, the biasing device 32 configured in particular as a coil spring preferably presses against the front face inner surface 29 so that the freewheel component 20 is biased in the engagement position 31. The coil spring 32 is supported at the other end preferably on the outer ring of the rotor bearing 6. This achieves a minimum axial mounting space whereby the rigidity of the hub can be markedly increased overall.

As is illustrated in FIG. 3, an axial distance 26 between the roller bearings 14 and 24 for rotatably supporting the hub shell is achieved which is clearly larger than in the prior art. This considerably increases the rigidity and stability of the hub. This considerable increase of the axial distance 26 by several millimeters eliminates a double-end, floating axial support of the freewheel components 10 and 20 while still providing increased rigidity of the hub. The freewheel components 10, 20 which are in particular configured as toothed disks show even wear and a safe function is achieved. Moreover, the weight of the hub can be clearly reduced. Compared to the prior art, the axial distance 26 between the inner rings of the roller bearings for supporting the hub shell can be enlarged by more than 5 or even 6 mm. The axial distance 27 between the rotor bearings may likewise be increased by more than 1 mm so that the stability under load of the hub 1 increases and the lateral stiffness can be considerably increased.

FIGS. 5 and 6 show the hub-side freewheel component 10 in a perspective view and in section. It is apparent that the hub-side freewheel component allows a compact architecture. The annular appendix 17 allows a defined axial positioning of the hub-side freewheel component 10 in the hub shell 2. The hub-side freewheel component 10 is screwed into the hub shell 2 by means of the attachment area 10a and the external thread 10c configured therein. The centering area 10b together with the centering portion 2b in the hub shell 2 ensure a defined radial seat of the hub-side freewheel component 10. A reproducible seat is also achieved when exchanging the roller bearing 14 or the hub-side freewheel component 10.

The engagement components 33 are formed on the axially outside surface 18b on the front face 22 of the annular flange 18 which extends radially inwardly in particular from the axial and presently tubular body section 13.

In radial cross-section, the approximately T-shaped structure 45 can be seen where the bearing seat 12 is formed radially inwardly where the roller bearing 14 shows a defined accommodation.

The multiple external thread 10c with the two thread grooves 10e and 10f enables increased durability. Compared to a single thread a double gradient R is provided with the same pitch P so that self-retention and the axial forces are reduced.

The roller bearing 14 has an axial width 16 and is supported in the axial body section 13 on the bearing seat 12 over the length of the attachment area 10a across the majority, presently between 80% and 90%, of its axial width. The fact that the roller bearing 14 protrudes somewhat axially inwardly may moreover ensure a precisely defined axial arrangement. An axial over definition is avoided.

The roller bearing 14 has an outer ring 50 and an inner ring 52 between which the rolling members 53 are disposed in guide grooves 56. Sealing units 57 seal the roller bearing 14 in both axial directions.

For better clarity, the illustration of the roller bearing 14 was omitted in the bottom part of FIG. 5. When the roller bearing 14 is installed it is axially secured in the hub shell by the freewheel component 10 screwed into the hub shell.

FIG. 7 shows an illustration of essential parts of the hub 1 according to the invention. On the left, the limit stop 39 is shown which after installation or insertion of the roller bearing 24 into the hub sleeve 2 can be pushed onto the hub axle 5. The hub axle 5 shows radial bulges 43 and 44. On the rotor side of the hub shell 2, the roller bearing 14 is accommodated on the bearing seat 12 of the hub-side freewheel component 10 and is screwed into the hub shell 2 together with the freewheel component 10. The centering portion 2b and the centering area 10b ensure a defined radial positioning. Thereafter the sealing device 38 is inserted and the sleeve body 41 is pushed on.

The rotor bearings 6 and 7 with the sleeve body 42 in-between are inserted into the rotor 8. The biasing device 32 and the rotor-side freewheel component 20 are inserted into the rotor 8 and the rotor 8 is pushed onto the hub axle 5. Finally, the limit stop 40 is pushed on.

Figure 8:
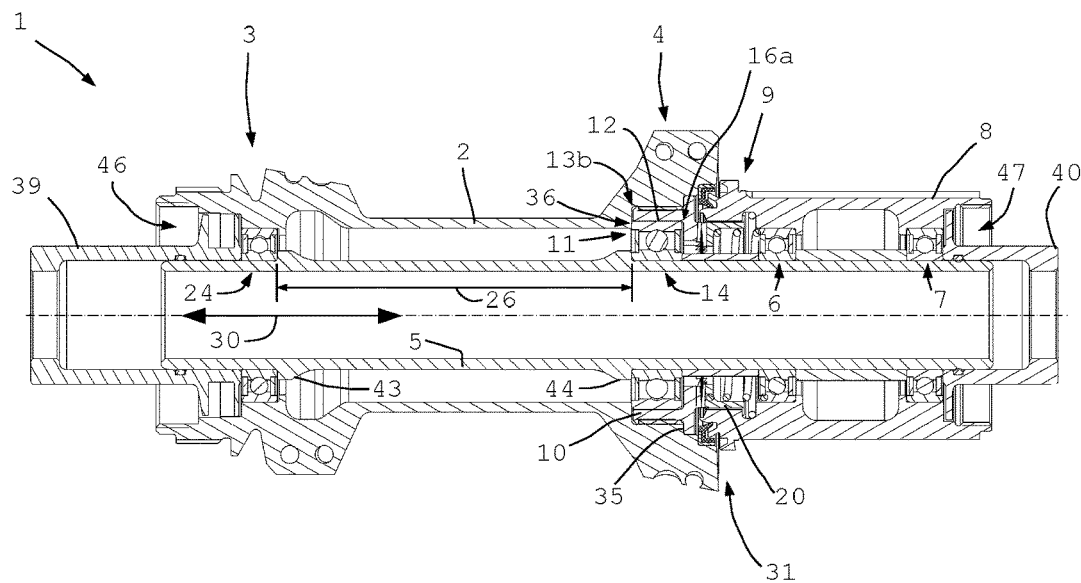
FIG. 8 a section of another hub according to the invention.
Figure 9:
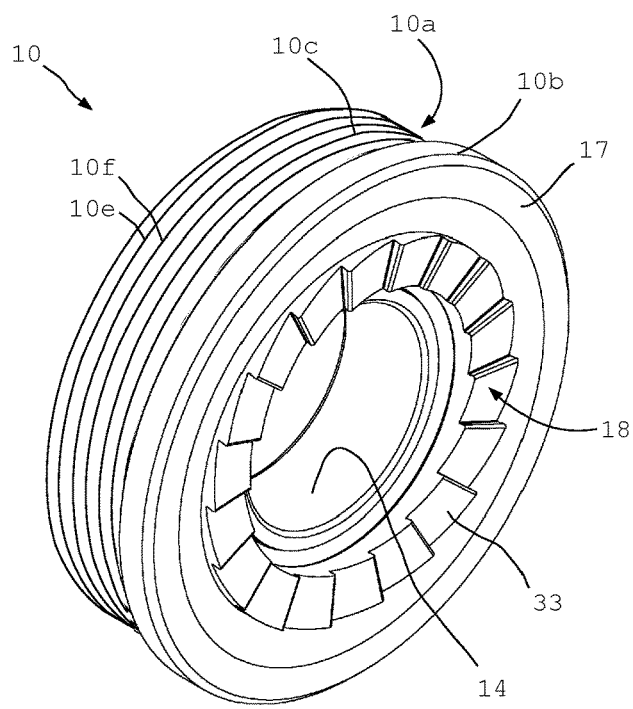
FIG. 9 a perspective illustration of the hub-side freewheel component of the hub according to FIG. 8.
Figure 10:
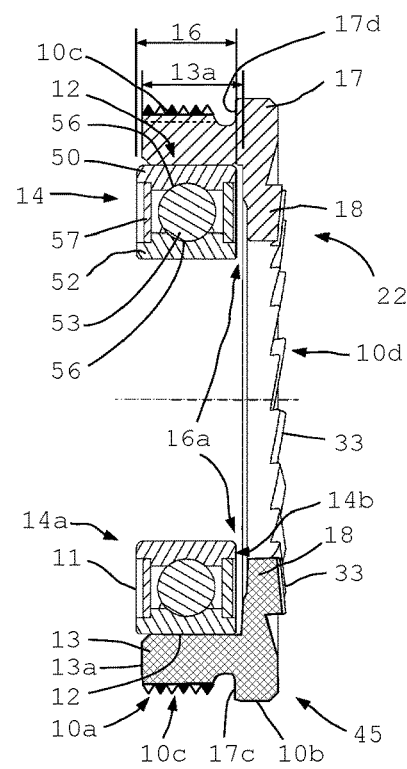
FIG. 10 a section of the hub-side freewheel component according to FIG. 9.

The FIGS. 8 to 10 illustrate a slightly modified exemplary embodiment. The reference numerals are identical so that the description of the preceding exemplary embodiment may be referred to identically, apart from a few deviating parts, and it serves again to describe this exemplary embodiment. Substantial differences and the substantial parts deviating from the preceding exemplary embodiment will be discussed below.

FIG. 8 shows a section of the complete hub, FIG. 9 shows a perspective illustration of the hub-side freewheel component 10 and FIG. 10 shows a section of FIG. 9.

Unlike in the preceding exemplary embodiment, this hub 1 is not provided with radially circumferential spoke flanges but the hub 1 is equipped with accommodations for mounting so-called "straight pull" spokes. Then, the hub shell may be configured accordingly to accommodate e.g. straight, non-cranked spokes ("straight pull spokes"). However, the hub 1 according to FIG. 8 may be equipped as is the hub 1 according to FIG. 3, with conventional and circumferential spoke flanges or the like.

Another difference to the hub 1 according to FIG. 3 is that both FIG. 8 and FIG. 10 explicitly show a recognizable, free distance 16a. The free distance 16a provides sufficient axial play. The roller bearing 14 accommodated in the freewheel component 10 rests against the axially inwardly end 14a showing the outer bearing ring respectively outer ring 50 on the bearing shoulder 36 in the hub shell 2 to provide defined alignment of the roller bearing 14.

In the same way as in the preceding exemplary embodiment, the outside surface of the hub-side freewheel component 10 is configured with a double external thread 10c having thread grooves 10e and 10f.

The thread grooves 10e and 10f run axially offset by the pitch P and are configured in parallel to one another. This means that in the axial direction, the first thread groove 10e (in FIGS. 6 and 10 showing a white cross-section) and the second thread groove (in FIGS. 6 and 10 showing a black cross-section) alternate.

The axially outwardly end 14b of the roller bearing 14 shows the free distance 16a respectively the play or the gap between itself and the axially inside surface 18c of the annular flange 18. The free distance 16a is in particular larger than 0.01 mm and it is preferably more than 0.1 mm, in particular approximately 0.2 mm. The exemplary embodiment according to FIG. 3 also comprises a (narrower) free distance 16a which is not recognizable in the scale of the drawing.

FIG. 10 shows the stopper 17d formed on the axially inside surface 17c of the appendix 17. In the mounted state the stopper 17d rests against the radial bearing shoulder 36 in the hub shell. The stopper 17d together with the radial bearing shoulder 36 prevents the hub-side freewheel component from screwing ever further into the hub shell 2. Absent such boundary, any rotational force acting on the axial toothing will over time result in ever increasing screwing in. Thus, absent the stopper 17d, the hub shell might be dilated and even burst since the freewheel is configured for transmitting rotational forces of up to 400 Nm or more.

Another contribution is due to the clear distance 13b which is configured (in the axial direction) between the axially inwardly front face of the axial body section and the hub shell and is presently between approximately 0.08 mm and 0.35 mm. This is to ensure that the axial body section 13 screws into the hub shell up to the stopper 17d where it is supported on the hub shell.

Dismantling and maintenance of the hub 1 is accordingly simple and may be performed manually anytime to clean the hub after use for example in off-road terrain or following an extended road ride. This enables to ensure an always reliable function.

The hub shell according to the FIGS. 8 to 10 is also provided with an attachment area 2a, a centering portion 2b, and a multiple internal thread 2c for a multiple external thread 10c of the hub-side freewheel component 10 to screw in, while a guide and/or centering is achieved by the fit of the centering area 10b in the centering portion 2b.

Again, a radial tolerance or play in the centering area 10b is considerably smaller than in the attachment area 10a, so as to enable a reproducible assembly and reproducible exchange of parts and components. The more precise positioning also increases reliability and durability.

Figure 11:
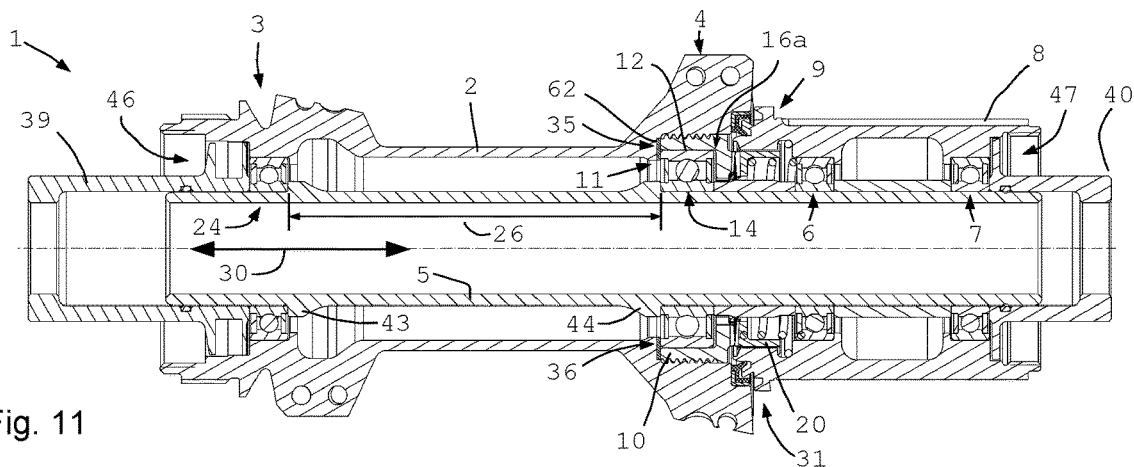
FIG. 11 a section of another hub according to the invention.
Figure 12A:
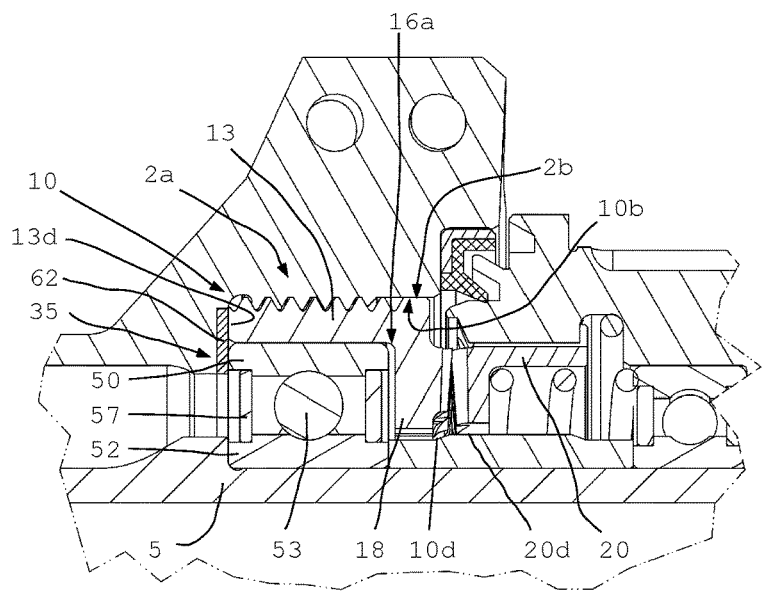
FIG. 12a an enlarged detail of FIG. 11.
Figure 12B:
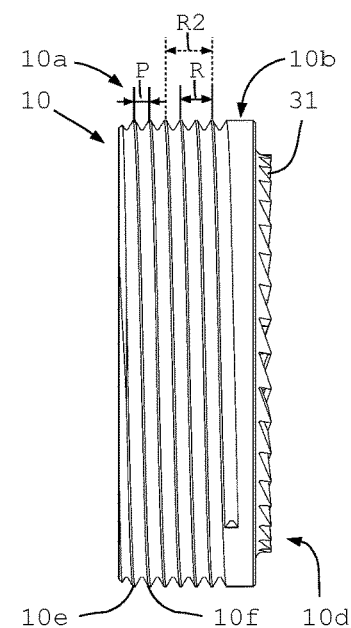
FIG. 12b a side view of the hub-side freewheel component of FIG. 11.
Figure 12C:
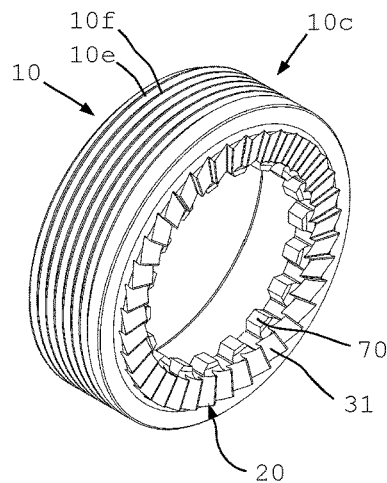
FIG. 12c a perspective of the hub-side freewheel component of FIG. 11.
Figure 13:
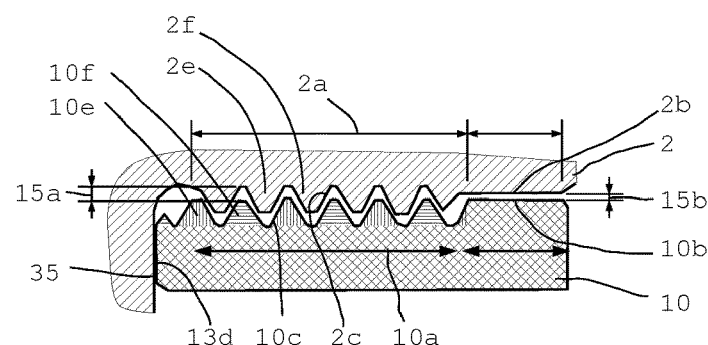
FIG. 13 a schematic diagrammatic drawing of a detail in FIG. 12.
Figure 14:
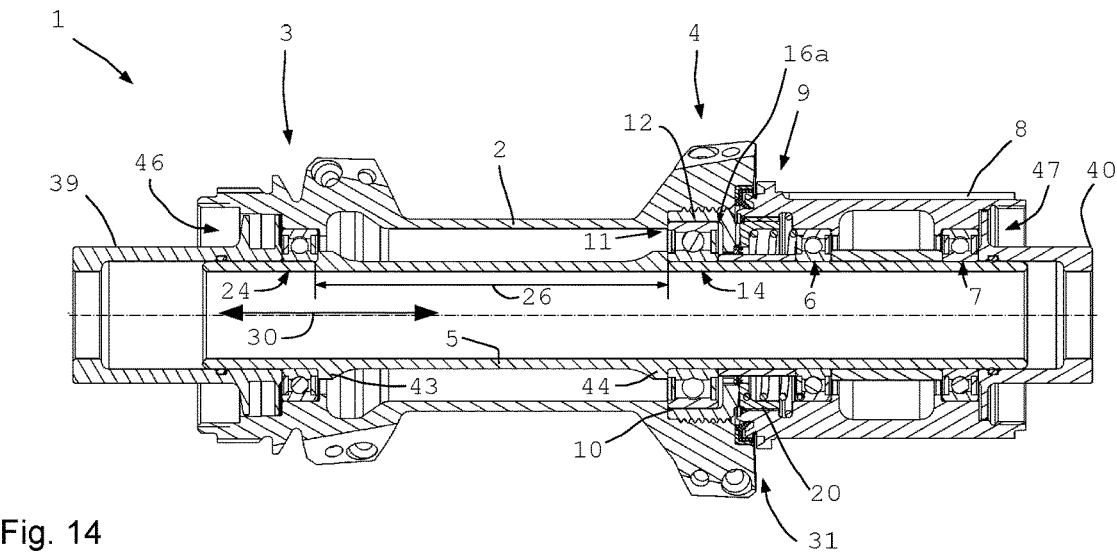
FIG. 14 a section of another hub according to the invention.
Figure 15:
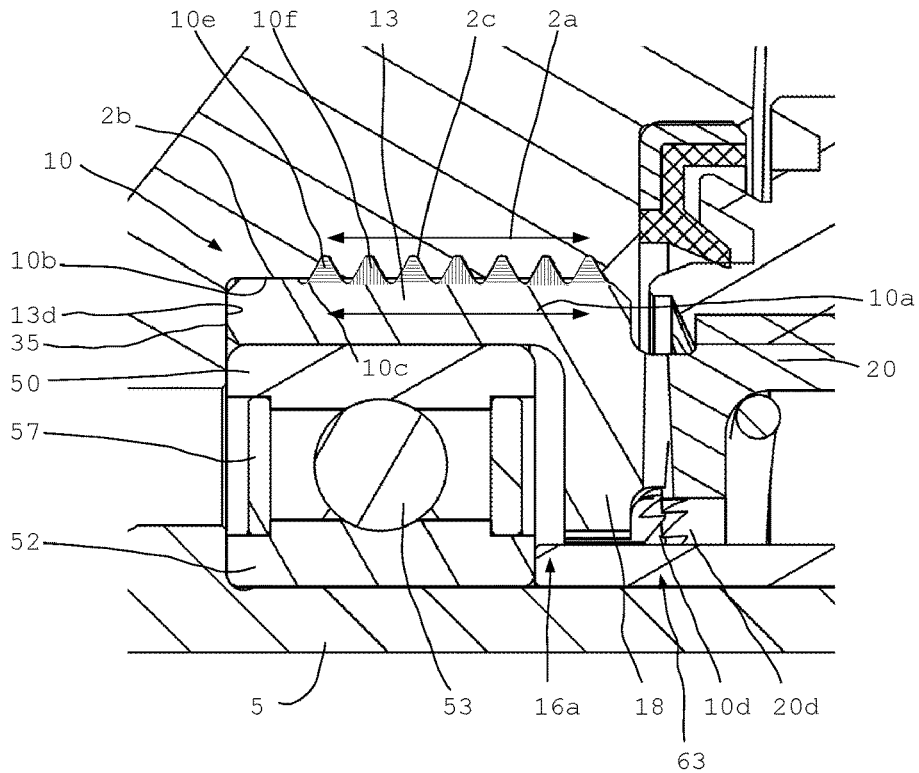
FIG. 15 an enlarged detail from FIG. 14.
Figure 16:
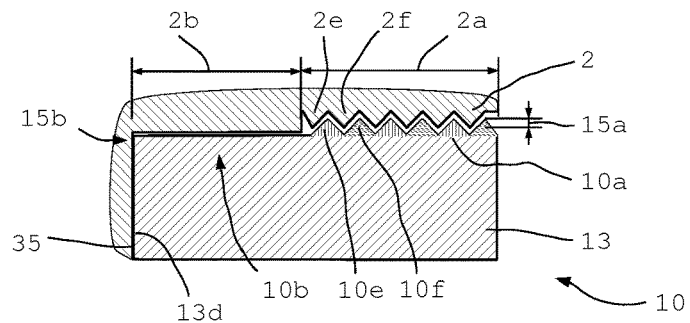
FIG. 16 a schematic diagrammatic drawing of a detail in FIG. 15.

The FIGS. 11 to 13 and the FIGS. 14 to 16 each show slightly modified exemplary embodiments. The reference numerals are again identical so that the description of the preceding exemplary embodiments applies identically, apart from a few deviating parts, and also serves to describe these exemplary embodiments which is why it is not repeated in its entirety and may be inserted as required. Substantial differences and the substantial parts deviating from the preceding exemplary embodiment will be discussed below.

FIG. 11 shows a section of the entire hub 1, FIG. 12a shows an enlarged detail of FIG. 11. FIGS. 12b and 12c show a side view and a perspective of the hub-side freewheel component 10. FIG. 13 shows a simplified, simplistic diagrammatic drawing not to scale, of a detail in FIG. 12a.

A substantial difference to the exemplary embodiment according to FIG. 8 is that the hub-side freewheel component 10 comprises hardly any radial appendix 17 or even none at all. The axial body section 13 of the hub-side freewheel component 10 shows an approximately consistent radial diameter. The attachment area 10a with the multiple external thread 10c extends toward the axially inwardly end of the axial body section 13, while toward the axially outwardly end extends the centering area 10b, which together with the centering portion 2b ensures a precisely defined fit and thus a precisely defined radial positioning and orientation of the hub-side freewheel component 10. The radial tolerances or the radial play in the centering area 10b is considerably smaller than in the attachment area 10a. In this configuration, the hub-side freewheel component 10 may first be configured cylindrically having the diameter of the centering area 10b and it is possible for a multiple thread 10c to be cut or tapped thereafter over only part of the axial length so as to create the attachment area 10a. The outer diameter in the attachment area 10a may also be reduced somewhat to facilitate passage through the centering portion 2b.

This hub 1 prevents the attachment component 10 from screwing too far into the hub shell 2 also in that the axially inwardly front face 13a of the axial body section 13 rests against the radial shoulder 35 in the hub shell.

Again, the external thread 10c of the hub-side freewheel component 10 is provided with two thread grooves 10e and 10f which are screwed to the thread grooves 2e and 2f of an adapted internal thread 2c in the hub shell 2. FIG. 12b shows in broken lines a variant having a triple thread comprising a gradient R2 that is three times the size of a single thread.

Another difference is that a thin washer 62 is disposed on the axial contact surface between the hub-side freewheel component 10 and the hub shell 2. The washer 62 is provided with a contact surface that is larger toward the hub shell than toward the hub-side freewheel component 10. This allows enhanced dissipation and distribution of the forces generated. The washer 62 consists of a material showing higher load resistance than does the hub shell, for example a suitable steel.

FIG. 13 shows a simplistic detail from FIG. 12 which illustration is not to scale to better show the principle. Where the centering portion 2b and the centering area 10b overlap, there is a radial tolerance 15b or radial play while a considerably larger tolerance 15a is provided in the attachment area 10a and the attachment portion 2a. This achieves a clearly better, and better repeatable, radial positioning of the hub-side freewheel component 10 and thus also of the roller bearing 14 which rotatably supports one side of the hub 1 on the hub axle 5. Even minor radial changes may show major axial effects on the rim. The teeth of each of the thread grooves 10e and 10f show different hatching to more clearly show the various thread grooves 2e and 2f.

This embodiment according to the FIGS. 11 to 13 allows a particularly slim configuration of the hub 1. A further weight reduction is possible, also by reducing the wall thicknesses in the hub shell. The total weight may be reduced by 5 gr or even 10 gr or more compared to a hub similar in construction where the roller bearing is not accommodated in a bearing seat on the freewheel component but is directly inserted in the hub shell. This results in a considerable reduction of ca. 5% combined with increased stability. The slimmer configuration also reduces air drag.

FIG. 13 also shows radially inwardly of the hub-side freewheel component 10 a tool contour 70 which facilitates opening by means of an adapted tool. A tool contour 70 is preferably configured in all the configurations and exemplary embodiments. The tool contour 70 may show different shapes, for example the contour shown. Alternately, an inner polygon or suitable depressions are conceivable.

FIG. 14 shows a section of the hub 1 according to another exemplary embodiment, FIG. 15 shows an enlarged detail from FIG. 14, and FIG. 16 finally shows a simplified, simplistic diagrammatic drawing not to scale, of a detail in FIG. 15. Unlike the exemplary embodiment according to FIGS. 11 to 13, the centering portion 2b and the centering area 10b are located axially inwardly while the attachment portion 2a and the attachment area 10a are disposed axially farther outwardly.

The intermeshing double threads 10c and 2c with pertaining thread grooves 10e, 10f and 2e, 2f are recognizable schematically. The two thread grooves 10e, 10f show different hatching in the FIGS. 15 and 16.

Simple manufacturing is again possible. The axially inwardly end 13a forms a stopper 13d of the axial body section 13 and rests against the radial shoulder 35 in the hub shell 2 and prevents the hub-side freewheel component 10 from screwing in too far. The centering area 10b of the hub-side freewheel component 10 is presently disposed adjacent to the axially inwardly end 13a.

FIG. 16 shows a simplistic detail from FIG. 15 and shows, as does FIG. 13 above, that a radial tolerance 15b respectively radial play is given in the centering area 10b which is less than in the attachment area 10a.

The further details in the FIGS. 14 to 16 substantially correspond to the preceding exemplary embodiments.

In all the configurations the hub allows increased lateral stiffness, an increased bending stiffness, and a still safe operation, and easier maintenance. At the same time the weight may be reduced which is of particular importance in the area of sports and for professional use.

Another advantage is the smaller cross-section of the hub shell which is thus aerodynamically better. The quantity of parts is smaller so as to make servicing, assembly and disassembly easier. Manufacturing the hub is also easier.

A considerable advantage is achieved by the multiple threads so as to result in reduced loads on the hub shell and reduced self-retention.

In all the configurations, it is preferred to employ ground inner bearing rings in the roller bearings. A ground outer ring may also be employed so as to obtain very low frictional values.

While a particular embodiment of the present hub, in particular for bicycles, has been described herein, it will be appreciated by those skilled in the art that changes and modifications may be made thereto without departing from the invention in its broader aspects and as set forth in the following claims.

LIST OF REFERENCE NUMERALS

1 hub
2 hub shell
2a attachment portion
2b centering portion
2c internal thread
2e thread groove
2f thread groove
3, 4 end region
5 hub axle
6, 7 rotor bearing
8 rotor
9 freewheel device
10 hub-side freewheel component
10a attachment area
10b centering area
10c external thread
10d axial toothing
11 receiving space
12 bearing seat
13 axial body section
13a axially inwardly front face
13b clear distance
13d stopper
14 roller bearing
14a axially inwardly end
14b axially outwardly end
15a tolerance, play
15b tolerance, play
16 axial width
16a distance
17 appendix
17c axially inside surface
17d stopper
18 annular flange
18b axially outside surface
18c axially inside surface
19 inner surface of 18
20 rotor-side freewheel component
20d axial toothing
21 outer contour
22 front face of 10, 20
23 cylindrical guide section
24 roller bearing
25 through axle
26 bearing distance 14, 24
27 bearing distance 6, 7
28 rotor-side annular flange
29 inner surface of 28
30 axial direction 31 engagement position
32 biasing device
33 engagement components
35 radial shoulder in 2
36 radial bearing shoulder in 2
37 inner contour in 8
38 sealing device
39, 40 limit stop
41, 42 sleeve body
43, 44 radial bulges
45 T-shape
46 double flange of 39
47 sealing flange of 40
48 O-ring
49 quick release
50 outer ring of 14
51 outer ring of 24
52 inner ring
53 rolling member
55 raceway at 50
56 guide groove
57 sealing unit
58 seal ring
60 outer ring of 6, 7
61 inner ring of 6, 7
62 disk
63 freewheel position
70 inner contour
100 bicycle
101 wheel, front wheel
102 wheel, rear wheel
103 frame
104 fork, suspension fork
105 rear wheel damper
106 handlebar
107 saddle
109 spoke
110 rim
112 pedal crank
P pitch
R gradient

The invention claimed is:

1. A hub for at least partially muscle-powered vehicles, and in particular bicycles, the hub comprising:
a hub shell rotatably supported relative to a hub axle, said hub shell including an attachment portion and a centering portion configured in the hub shell;
a rotatably supported rotor; and
a freewheel device having two interacting freewheel components namely, a hub-side freewheel component and a rotor-side freewheel component, wherein the two freewheel components each comprise axial engagement components for intermeshing with one another,
wherein the hub-side freewheel component is non-rotatably and axially fixedly connected with the hub shell;
wherein the rotor-side freewheel component is non-rotatably connected with the rotor and is movable in the axial direction relative to the rotor and the hub shell at least between a freewheel position and an engagement position,
the hub-side freewheel component is connected with the hub shell through a multiple thread connection having at least two separate, axially spaced apart thread grooves, wherein an attachment area having the multiple thread connection and a centering area are configured on the hub-side freewheel component, and wherein the attachment area is screwed to the attachment portion and that the centering area is centered on the centering portion, and wherein a radial tolerance between the hub-side freewheel component and the hub shell on the attachment portion is larger than on the centering portion; and
wherein the hub-side freewheel component provides for defined accommodation of rolling members to support the hub shell relative to the hub axle.

2. The hub according to claim 1, wherein the centering portion and the centering area form a transition fit or an interference fit.

3. The hub according to claim 1, wherein the attachment portion and the attachment area are each provided with two, three or more thread grooves which are screwed to one another.

4. The hub according to claim 1, wherein the outer diameter of the attachment area is larger than that of the centering area.

5. The hub according to claim 1, wherein the thread grooves run in parallel and adjacent to one another.

6. The hub according to claim 1, wherein the attachment area is provided with an external thread with the thread grooves which screws into an internal thread with thread grooves on the attachment portion of the hub shell.

7. The hub according to claim 1, wherein the hub-side freewheel component has an axial body section with an inner central receiving space and a bearing seat formed thereat and a roller bearing received thereat to rotatably support the hub shell.

8. The hub according to claim 7, wherein the roller bearing rests against a washer.

9. The hub according to claim 1, wherein the hub-side freewheel component comprises an appendix protruding outwardly from an axial body section where the centering area is configured and wherein a stopper is formed on an axially inside surface of the appendix, which when mounted, rests against a radial shoulder of the hub shell or wherein a stopper is formed on a front face of the axial body section which in the mounted state, rests against a radial shoulder of the hub shell.

10. The hub according to claim 9, wherein the hub-side freewheel component comprises an inwardly projecting annular flange, and wherein the engagement components are configured on an axially outside surface of the annular flange.

11. The hub according to claim 10, wherein the axial body section with the outwardly projecting appendix and the inwardly projecting annular flange shows a T-, S-, or Z-shaped cross-section or wherein the axial body section with the inwardly projecting annular flange shows an L-shaped cross-section.

12. The hub according to claim 10, wherein the axial body section of the hub-side freewheel component is configured tubular.

13. The hub according to claim 10, wherein a free distance is configured between the roller bearing accommodated in the hub-side freewheel component and an axially inside surface of the inwardly projecting annular flange or wherein a clear distance is configured between an inner axial front face of an axial body section and the hub shell.

14. The hub according to claim 1, wherein the rotor-side freewheel component is biased in the engagement position through at least one biasing device and wherein the engagement components are each configured on a front face.

15. The hub according to claim 14, wherein the at least one biasing device comprises at least one coil spring and/or at least one magnetic spring.

16. The hub according to claim 1, wherein a radial bearing shoulder is formed in the hub shell for defined axial alignment of a roller bearing accommodated in the hub-side freewheel component.

17. The hub according to claim 1, wherein the rotor-side freewheel component comprises a guide section having a non-round outer contour meshing with an adapted non-round inner contour in the rotor to enable axial movability of the rotor-side freewheel component relative to the rotor and to provide the non-rotatable coupling between the rotor and the rotor-side freewheel component.

18. A hub for at least partially muscle-powered vehicles, and in particular bicycles, the hub comprising:
   a hub shell rotatably supported relative to a hub axle, said hub shell including an attachment portion and a centering portion configured in the hub shell;
   a rotatably supported rotor; and
   a freewheel device having two interacting freewheel components namely, a hub-side freewheel component and a rotor-side freewheel component, wherein the two freewheel components each comprise axial engagement components for intermeshing with one another,
   wherein the hub-side freewheel component is non-rotatably and axially fixedly connected with the hub shell,
   wherein the rotor-side freewheel component is non-rotatably connected with the rotor and is movable in the axial direction relative to the rotor and the hub shell at least between a freewheel position and an engagement position,
   the hub-side freewheel component is connected with the hub shell through a multiple thread connection having at least two separate, axially spaced apart thread grooves, wherein an attachment area having the multiple thread connection and a centering area are configured on the hub-side freewheel component, wherein the attachment area is screwed to the attachment portion and that the centering area is centered on the centering portion, and wherein the centering portion and the centering area form a free fit of less than 20 μm or less than 5 μm tolerance; and
   wherein the hub-side freewheel component provides for defined accommodation of rolling members to support the hub shell relative to the hub axle.

19. A hub for at least partially muscle-powered vehicles, and in particular bicycles, the hub comprising:
   a hub shell rotatably supported relative to a hub axle;
   a rotatably supported rotor; and
   a freewheel device having two interacting freewheel components namely, a hub-side freewheel component and a rotor-side freewheel component, wherein the two freewheel components each comprise axial engagement components for intermeshing with one another,
   wherein the hub-side freewheel component is non-rotatably and axially fixedly connected with the hub shell,
   wherein the rotor-side freewheel component is non-rotatably connected with the rotor and is movable in the axial direction relative to the rotor and the hub shell at least between a freewheel position and an engagement position,
   the hub-side freewheel component is connected with the hub shell through a multiple thread connection having at least two separate, axially spaced apart thread grooves, and wherein a washer is disposed between a shoulder in the hub shell and the hub-side freewheel component; and
   wherein the hub-side freewheel component provides for defined accommodation of rolling members to support the hub shell relative to the hub axle.

20. The hub according to claim 19, wherein the washer has a contact surface with the hub shell that is larger than that with the hub-side freewheel component.

21. The hub according to claim 19, wherein the washer consists of a material that is harder than aluminum, such as steel.

* * * * *